(12) United States Patent
Fan et al.

(10) Patent No.: US 8,908,948 B2
(45) Date of Patent: Dec. 9, 2014

(54) METHOD FOR BRAIN TUMOR SEGMENTATION IN MULTI-PARAMETRIC IMAGE BASED ON STATISTICAL INFORMATION AND MULTI-SCALE STRUCTURE INFORMATION

(75) Inventors: Yong Fan, Beijing (CN); Hongming Li, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 124 days.

(21) Appl. No.: 13/806,493

(22) PCT Filed: Dec. 21, 2011

(86) PCT No.: PCT/CN2011/084340
§ 371 (c)(1),
(2), (4) Date: Jan. 22, 2013

(87) PCT Pub. No.: WO2013/091186
PCT Pub. Date: Jun. 27, 2013

(65) Prior Publication Data
US 2013/0182931 A1    Jul. 18, 2013

(51) Int. Cl.
*G06K 9/00* (2006.01)
*G06T 7/00* (2006.01)

(52) U.S. Cl.
CPC ..... *G06T 7/0081* (2013.01); *G06T 2207/30016* (2013.01); *G06T 2207/30096* (2013.01); *G06T 2207/20081* (2013.01); *G06T 7/0087* (2013.01); *G06T 2207/20076* (2013.01); *G06T 2207/10088* (2013.01); *Y10S 128/922* (2013.01)
USPC ............................... 382/128; 128/922; 378/4

(58) Field of Classification Search
USPC ......... 382/100, 103, 128, 129, 130, 131, 132; 128/922; 348/169–172; 378/4–27
See application file for complete search history.

(56) References Cited

U.S. PATENT DOCUMENTS 6,138,045 A * 10/2000 Kupinski et al. ............... 600/425
6,891,964 B2 * 5/2005 Doi et al. ...................... 382/131

(Continued)

FOREIGN PATENT DOCUMENTS

CN    101061509 A    10/2007
CN    101515368 A    8/2009

(Continued)

OTHER PUBLICATIONS

Li et al., "Label Propagation with Robust Initialization for Brain Tumor Segmentation", Biomedical Imaging (ISBI), 2012 9th IEEE International Symposium on Date of Conference, pp. 1715-1718; May 2-5, 2012, 4 total pages.

(Continued)

*Primary Examiner* — Anand Bhatnagar
(74) *Attorney, Agent, or Firm* — Westman, Champlin & Koehler, P.A.

(57) ABSTRACT

A method for brain tumor segmentation in multi-parametric 3D magnetic resonance (MR) images, comprising: determining, for each voxel in the multi-parametric 3D MR image sequence, a probability that the voxel is part of brain tumor; extracting multi-scale structure information of the image; generating multi-scale tumor probability map based on initial tumor probability at voxel level and multi-scale structure information; determining salient tumor region based on multi-scale tumor probability map; obtaining robust initial tumor and non-tumor label based on tumor probability map at voxel level and salient tumor region; and generating a segmented brain tumor image using graph based label information propagation. The present invention is capable of achieving statistical reliable, spatially compact, and robust tumor label initialization, which is helpful to the accurate and reliable tumor segmentation. And the label information propagation framework could partially alleviate the performance degradation caused by image inconsistency between images to be segmented and training images.

11 Claims, 5 Drawing Sheets

(56) References Cited

U.S. PATENT DOCUMENTS

| | | | | |
|---|---|---|---|---|
| 7,474,776 | B2* | 1/2009 | Kaufman et al. | 382/128 |
| 8,073,226 | B2* | 12/2011 | Farag et al. | 382/131 |
| 8,218,835 | B2* | 7/2012 | Matsuda et al. | 382/128 |
| 8,280,133 | B2* | 10/2012 | Wels et al. | 382/128 |
| 8,445,851 | B2* | 5/2013 | Rousso et al. | 250/363.04 |
| 8,724,866 | B2* | 5/2014 | Wu et al. | 382/128 |
| 2008/0002870 | A1* | 1/2008 | Farag et al. | 382/128 |
| 2010/0027865 | A1* | 2/2010 | Wels et al. | 382/131 |
| 2012/0093381 | A1* | 4/2012 | Fan et al. | 382/131 |

FOREIGN PATENT DOCUMENTS

| | | |
|---|---|---|
| CN | 101596109 A | 12/2009 |
| CN | 101739681 A | 6/2010 |
| CN | 101969852 A | 2/2011 |

OTHER PUBLICATIONS

Sharon et al., "Fast Multiscale Image Segmentation", Computer Vision and Pattern Recognition, 2000, Proceedings, IEEE Conference on Date of Conference: 2000, vol. 1, pp. 77-77; 2000, 8 total pages.

Chung et al., "An Evolutionary Approach to Pattern-Based Time Series Segmentation", IEEE Transactions on Evolutionary Computation, vol. 8, vol. 5, pp. 471-489, Oct. 2004, 19 total pages.

Zhou et al., "Learning with Local and Global Consistency", Advances in Neural Information Processing Systems 16, MIT Press 2004, pp. 321-328; 2004, ISBM 0-262-20152-6, 8 total pages.

Niessen et al., "Multiscale Segmentation of Three-Dimensional MR Brain Images", International Journal of Computer Vision 3 1(2/3), pp. 185-202; 1999, 18 total pages.

Heckemann et al., "Automatic Anatomical Brain MRI Segmentation Combining Label Propagation and Decision Fusion", NeuroImage 33 (2006), pp. 115-126; 2006, 12 total pages.

Bae et al., "Automated Segmentation of Mouse Brain Images Using Extended MRF", NeuroImage 46 (2009), pp. 717-725; 2009, 20 total pages.

Li et al., "Segmentation of Brain Tumors in Multi-parametric MR Images via Robust Statistic Information Propagation", ACCV 2010, pp. 606-617, 12 total pages.

Wang et al., "Fully Automatic Brain Tumor Segmentation Using a Normalized Gaussian Bayesian Classifier and 3D Fluid Vector Flow", ICIP 2010, pp. 2553-2556, 4 total pages.

Smith et al., "Advances in Functional and Structural MR Image Analysis and Implementation as FSL", NeuroImage 23 (2004), pp. 208-219, 12 total pages.

Smith, Stephen M., "Fast Robust Automated Brain Extraction", Human Brain Mapping 17 (2002), pp. 143-155, 13 total pages.

Sled et al., "A Nonparametric Method for Automatic Correction of Intensity Nonuniformity in MRI Data", IEEE Transactions on Medical Imaging, vol. 17, No. 1, Feb. 1998, pp. 87-97, 11 total pages.

International Search Report and Written Opinion for PCT Application No. PCT/CN2011/084340, dated Oct. 4, 2012, 14 pages.

* cited by examiner

METHOD FOR BRAIN TUMOR SEGMENTATION IN MULTI-PARAMETRIC IMAGE BASED ON STATISTICAL INFORMATION AND MULTI-SCALE STRUCTURE INFORMATION

CROSS-REFERENCE TO RELATED APPLICATION

This Application is a Section 371 National Stage Application of International Application No. PCT/CN2011/084340 filed on Dec. 21, 2011, in Chinese, the contents of which are hereby incorporated by reference in their entirety.

BACKGROUND OF THE INVENTION

The present invention relates to medical imaging of the brain, and particularly to fully automatic segmentation of brain tumors in multi-parametric 3D MR images.

Detection and segmentation of brain tumor in magnetic resonance images is of great importance in medical diagnosis. Reliable and precise tumor segmentation provides helpful information for surgical planning and therapy accessing. However, manual segmentation of brain tumor images commonly used in clinics is time-consuming, labor-intensive and subjective to considerable variation in intra- and inter-rater performance. Accordingly, a method for fully automatic brain tumor segmentation is desirable.

Several tumor segmentation methods have been proposed recently, such as supervised classification based methods, unsupervised clustering based methods and active contour based methods. Supervised classification based methods with spatial regularization achieve promising performance, however, inconsistency between images to be segmented and training images will degrade the segmentation performance. And clustering or active contour based methods always need proper parameter initialization to achieve reliable segmentation. To partially overcome these limitations, graph based interactive segmentation algorithms become popular in medical image segmentation, such as graph-cut, and random BU walks. For these methods, seed points for both target and background region are needed, and their locations and sizes may influence the segmentation result much. The seed selection in 3D image is time-consuming, and not easy when the boundary of target region is fuzzy. Some automatic seed selection methods have been proposed (Li et al., "Segmentation of Brain Tumors in Multi-parametric MR Images via Robust Statistic Information Propagation", ACCV 2010, pgs. 606-617, and Wang et al., "Full Automatic Brain Tumor Segmentation Using A Normalized Gaussian Bayesian Classifier and 3D Fluid Vector Flow", ICIP 2010, pgs. 2553-2556), in which the images are first pre-segmented by supervised classifier, and then thresholding and morphological operations are applied to get the initial target and background region. However, the tuning of the parameters included in the post-processing is not trivial for different images.

SUMMARY OF THE INVENTION

The subject of the present invention provides a method for segmenting brain tumors in multi-parametric 3D MR images.

A method for brain tumor segmentation in multi-parametric 3D magnetic resonance (MR) images, comprising:
determining, for each voxel in the multi-parametric 3D MR image sequence, a probability that the voxel is part of brain tumor;
extracting multi-scale structure information of the image;
generating multi-scale tumor probability map based on initial tumor probability at voxel level and multi-scale structure information;
determining salient tumor region based on multi-scale tumor probability map;
obtaining robust initial tumor and non-tumor label based on tumor probability map at voxel level and salient tumor region; and
generating a segmented brain tumor image using graph based label information propagation.

The present invention is capable of achieving statistical reliable, spatially compact, and robust tumor label initialization, which is helpful to the accurate and reliable tumor segmentation. And the label information propagation framework could partially alleviate the performance degradation caused by image inconsistency between images to be segmented and training images.

DETAILED DESCRIPTION OF EXEMPLARY EMBODIMENTS

Figure 1:
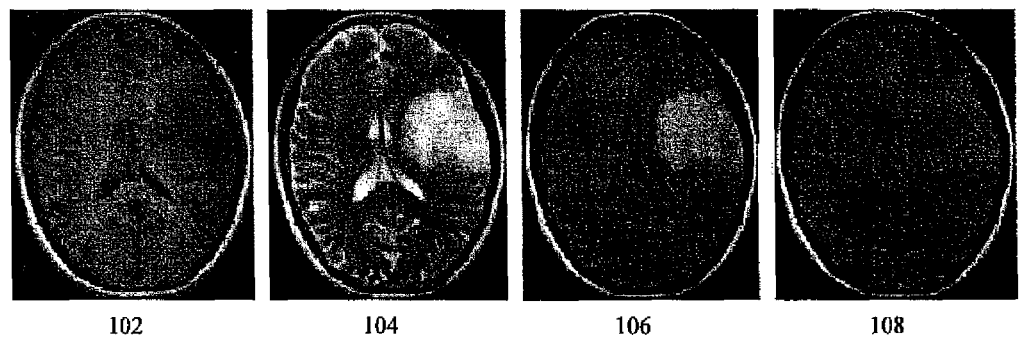
FIG. 1 illustrates exemplary MR images showing brain tumor.

Embodiments of the present invention are directed to fully automatic brain tumor segmentation in multi-parametric 3D MR images. A multi-parametric 3D image sequence can include T1 weighted MR volume, T2 weighted MR volume, the fluid attenuation inversion recovery (FLAIR) MR volume (or the contrast enhanced T1 weighted MR volume). FIG. 1 illustrates exemplary MR images showing brain tumor. As illustration of FIG. 1, images 102, 104, 106 show an axial slice of a multi-parametric 3D MR image sequence. In particular, image 102 shows a T1 weighted image, image 104 shows a T2 weighted image, image 106 shows a FLAIR image, and image 108 shows a an annotated ground truth of brain tumor overlaid with the FLAIR image.

The present invention utilizes both the statistical tumor information from training images and the multi-scale structure information of the image to be segmented comprehensively to identify the initial tumor and non-tumor label, and subsequently applies the label information propagation to achieve the final segmentation. A trained support vector machine (SVM) classifier is used to determine a probability map that a voxel is part of brain tumor for each voxel based on its image context information. The technique called segmentation by weighted aggregation (SWA) is used to extract the multi-scale structure information of the image recursively. Multi-scale tumor probability map is then generated based on the probability map at voxel level and the multi-scale structure information, from which the salient tumor region is identified based on perceptual important points detection. The initial tumor and non-tumor label is extracted by considering both the tumor probability map at voxel level and the salient tumor region. The tumor segmentation is finally accomplished using the label information propagation framework.

Figure 2:
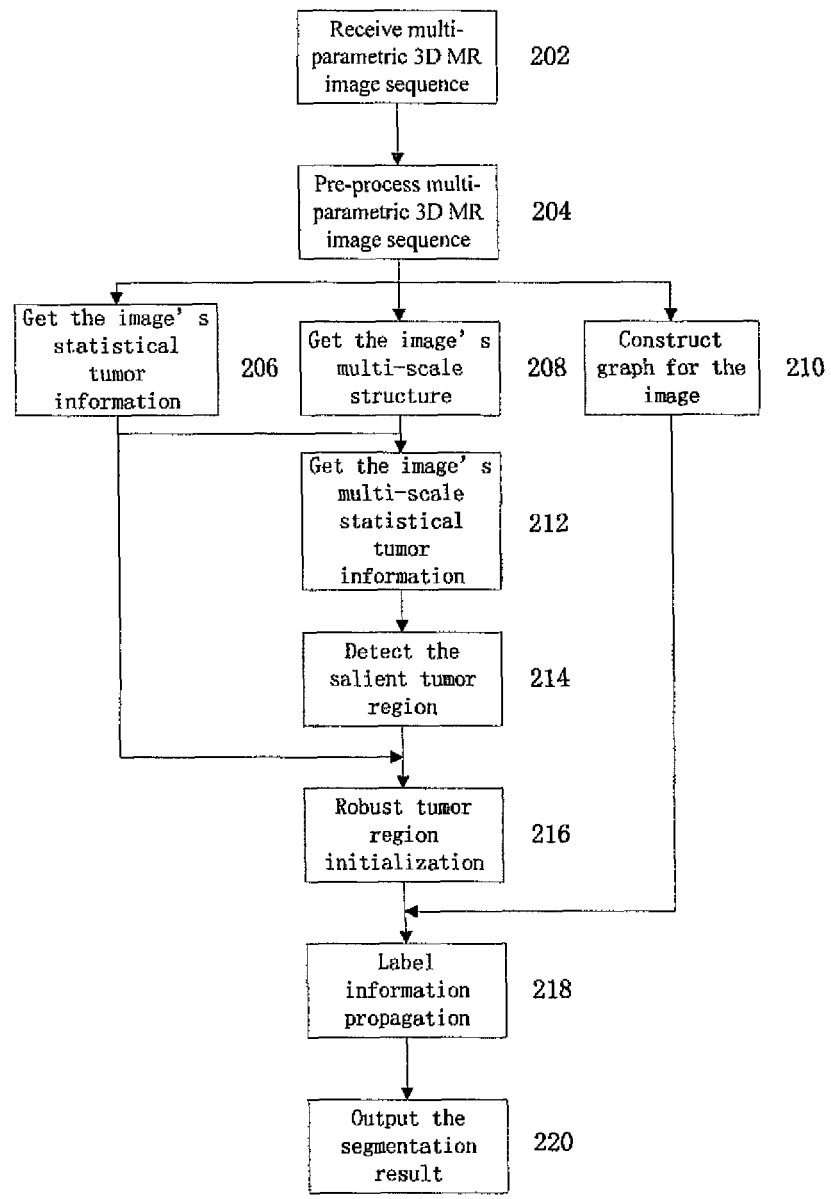
FIG. 2 illustrates the method for brain tumor segmentation in multi-parametric 3D MR images according to an embodiment of the present invention.

FIG. 2 illustrates the method for brain tumor segmentation in a sequence of multi-parametric 3D MR images according to an embodiment of the present invention.

At step 202, a sequence of multi-parametric 3D MR images is received. The sequence of multi-parametric 3D MR images is a sequence of 3D MR images acquired at different pulse sequences including T1 weighed MR volume, T2 weighted MR volume and the fluid attenuation inversion recovery (FLAIR) MR volume (or the contrast enhanced T1 weighted MR volume). Accordingly each voxel in the multi-parametric MR sequence has three intensity values, one for each of the 3D MR images.

At step 204, the multi-parametric 3D MR images are pre-processed. The pre-process is performed by the following well-known techniques: co-registration to compensate for possible motions between multi-parametric 3D MR scans, skull stripping to remove non-brain tissue in multi-parametric 3D MR images, bias field correction to remove intensity inhomogeneity partially in multi-parametric 3D MR images, and inter-subject intensity standardization. These techniques are described in detail in Smith et al., "Advances in Functional and Structural MR image Analysis and Implementation as FSL", NeuroImage 23 (2004), pgs. 208-219, Smith, "Fast robust Automated Brain Extraction", Human Brain Mapping 17 (2002), pgs. 143-155, Sled et al., "A Nonparametric Method for Automatic Correction of Intensity Non-uniformity in MRI Data", IEEE Trans. Med. Imaging 17 (1998), pgs. 87-97, respectively, all of which are incorporated herein by reference.

At step 206, a trained SVM classifier is used to determine a tumor probability map of multi-parametric 3D MR images, measuring each voxel's probability belonging to tumor. The SVM classifier is trained using a set of expert annotated training images. The feature vector for each voxel used for the SVM classifier consists of multi-parametric images intensity information of voxels within its spatial neighborhood. The parameters included in the training phase are determined using the cross-validation strategy. As spatial regularization is not considered in the traditional SVM, isolated false-positive tumor regions always exists, as shown in FIG. 504.

At step 208, multi-scale structure information of the image to be segmented is extracted by aggregation based method according to inter-voxel image similarity. Multi-scale framework could provide robust and abundant information which facilitates the detection of target region. An efficient method called segmentation by weighted aggregation (SWA) is adopted in this invention, which is described in detail in E. Sharon, et al, "Fast multiscale image segmentation", CVPR 2000, pgs. 70-77. SWA operates by recursively coarsening the initial image and produces multi-level images until the whole image contains only one cluster by modeling the image voxels as graph nodes. This generated hierarchy contains segments at different scales which capture discrete image characteristics. At the bottom of the hierarchy, segments may represent specific tissue information, such as grey matter (GM), white matter (WM), cerebral spinal fluid (CSF), necrotic region, active tumor and edema. As the level increases, the segments represent the non-tumor region and tumor region instead.

Figure 3:
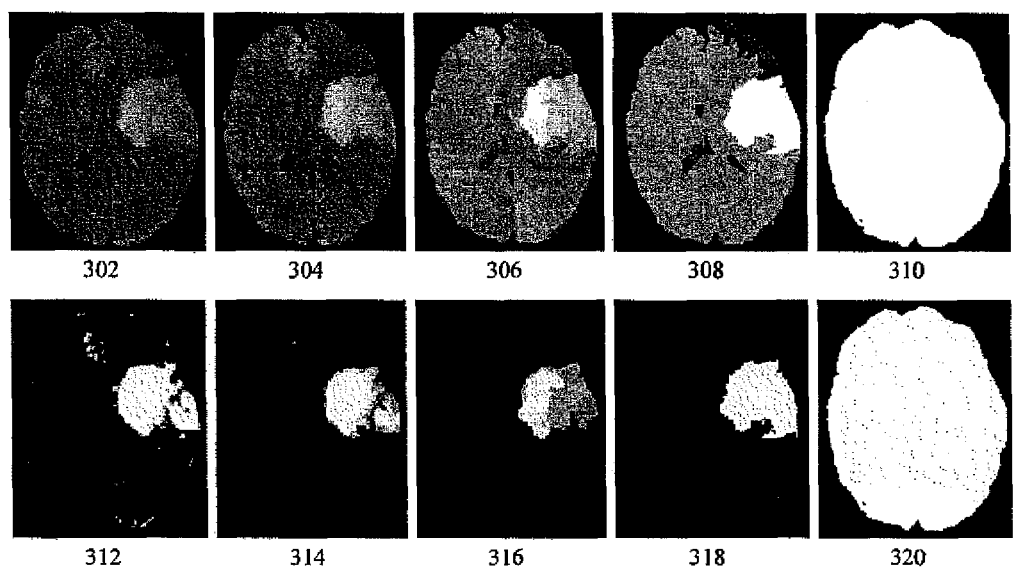
FIG. 3 illustrates exemplary multi-scale MR images and tumor probability maps.
Figure 4:
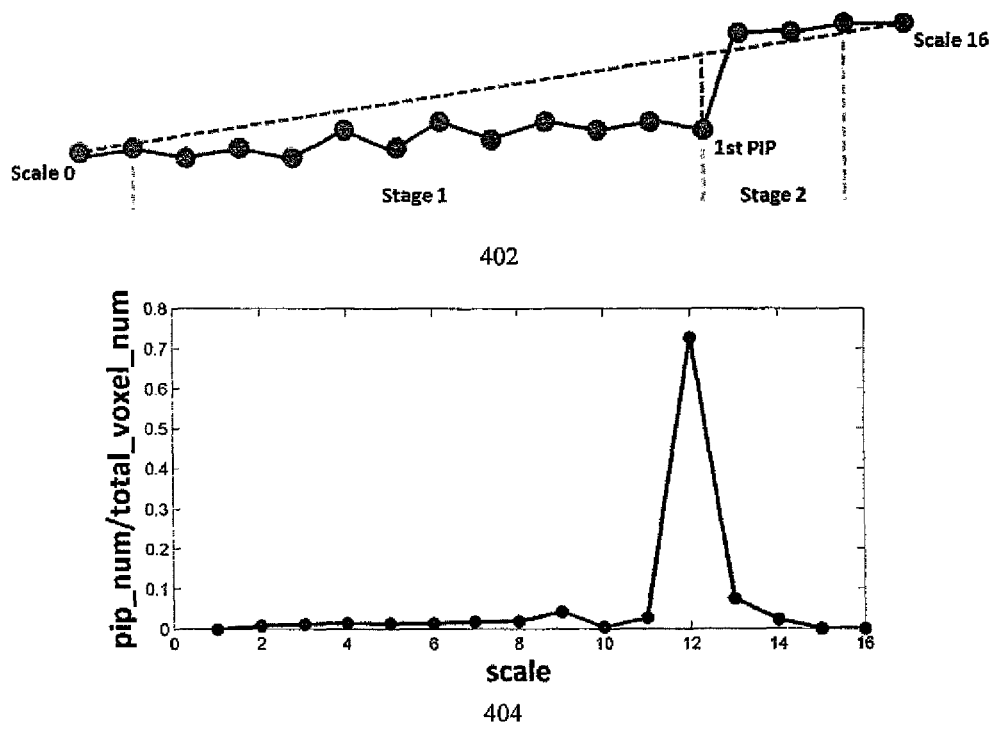
FIG. 4 illustrates the method for boundary scale detection.

At step 212, the tumor probability map is obtained by initial tumor probability map obtained at step 206 and multi-scale tumor probability map obtained at step 208 based on multi-parametric images. The aggregation procedure is applied to the tumor probability map using multi-parametric images. This procedure is equivalent to an adaptive smooth procedure for adaptively removing isolated tumor regions and enhancing highly reliable tumor regions with a view to the intrinsic image intensity structures. The aggregations of image intensity and tumor probability are illustrated in FIG. 3, in which images 302 to 310 show the FLAIR images at different scales, and images 312 to 320 show the tumor probability maps at different scales.

At step 214, salient tumor region is identified based on the multi-scale tumor probability map. The original SWA algorithm itself does not facilitate tumor detection, and perceptual important points detection is utilized to detect the salient tumor region in this embodiment, the implementation details could be found in F. L. Chung, et al, "An evolutionary approach to pattern-based time series segmentation", IEEE Transactions on Evolutionary Computation 8 (2004), pgs. 471-489. The aggregation described previously may progress in two distinct stages. At stage 1, non-tumor and tumor voxels merge into large regions separately. At stage 2, large non-tumor and tumor regions merge into mixed regions at coarser scales. Therefore, the candidate tumor region can be identified with information at the ending scale of stage 1, referred to as image boundary scale hereinafter. As the hierarchy structures of different images contain different numbers of scales and the tumors of different sizes present in different images, the boundary scale is not identical for different images. A novel detection strategy is proposed for detecting the image boundary scale. The tumor probability value of each voxel changes at different scales, a trace of tumor probability values can be obtained for each voxel by traversing the hierarchy. Assuming that the probability values do not vary too much at stage 1 and change dramatically between stages 1 and 2 since tumor and normal tissues become mixed with each other in stage 2, the image boundary scale is identified as the first perceptually important point of its trace of probability values for each voxel. The first perceptually important point reflects the change pattern of a voxel's tumor probability values, which could be calculated as:

$$\max_s \left| Tp_0 + (Tp_e - Tp_0) \times \frac{s}{e} - Tp_s \right|, \quad (1)$$

where $Tp_s$ is the tumor probability value at scale s, $Tp_0$ and $Tp_e$ are the tumor probability values at the first and last scales in the hierarchy respectively. The detection of the first perceptual important points is shown in graph 402. Once all candidate voxels' boundary scales are available, the image boundary scale is determined by majority voting of voxels' boundary scales, which is schematically illustrated in graph 404. Given the image boundary scale, the salient candidate tumor region is identified as following: the mean and standard deviation of all the aggregations' tumor probabilities at the boundary scale are first calculated, and then the aggregations with probability values far away more than one standard deviation from the mean probability are regarded as salient tumor region. Generally this procedure can successfully handle images with multiple tumors.

At step 216, initial tumor and non-tumor label is determined based on both tumor probability at voxel level and the salient candidate tumor region. Particularly, voxels within $SVM_t \cap Cand_t$ are labeled as reliable tumor voxels, and voxels within $(SVM_t \cup Cand_t) \setminus (SVM_t \cap Cand_t)$ are labeled as possible tumor voxels which are to be labeled by the subsequent graph model based information propagation, and all other voxels as robust non-tumor voxels as both the SVM classification and the candidate tumor voxel detection identify them as non-tumor, where $SVM_t$ denotes the tumor voxels identified by the SVM classification and $Cand_t$ denotes the salient tumor regions identified at step 214. The initial label identified by this procedure is statistically reliable and spatially compact. Only voxels classified robustly are initialized in order to alleviate the degradation caused by inter-subject image intensity inconsistency.

At step 210 and 218, the graph representation for the image to be segmented is built, and label information propagation is implemented based on the robust label initialization achieved at step 216. Graph theory based segmentation approaches model the image to be segmented as a graph G (V, E) where each node of V corresponds to a voxel of the image and each edge of E connects a pair of voxels and is associated with a weight of pair-wise voxel affinity. With the graph theory based image representation, the image segmentation problem is solved by assigning different labels to graph nodes. Given labeling information of a number of graph nodes, labels of unlabeled nodes of the graph can be predicted by exploiting the consistency between nodes based on the cluster assumption that nearby nodes or nodes on the same structure are likely to have the same label. Details about graph construction, objective function optimization are described in Zhou et al., "Learning with local and global consistency", Advances in Neural Information Processing Systems (2004), pgs. 321-328, and Li et al., "Segmentation of Brain Tumors in Multi-parametric MR Images via Robust Statistic Information Propagation", ACCV 2010, pgs. 606-617.

At step 220, the brain tumor segmentation results are output. The output can be overlaid on the multi-parametric 3D MR images, generating the segmented brain tumor image.

Figure 5:
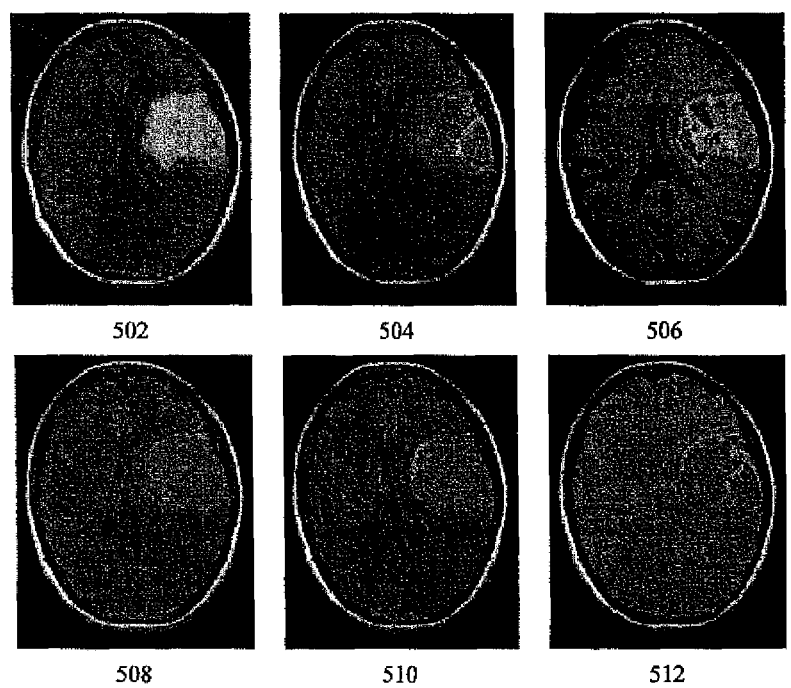
FIG. 5 illustrates exemplary brain tumor segmentation result for the images illustrated in FIG. 1.

FIG. 5 illustrates exemplary brain tumor segmentation result of FIG. 1 using the proposed method. As illustrated in FIG. 5, image 502 shows the same axial slice of the FLAIR image as the image 106 in FIG. 1, image 504 shows the segmentation of the brain tumor using only the output probability of the SVM classifier, image 506 shows the segmentation initialization of the brain tumor (colored blue) and health tissue (colored red) based on only thresholding and morphological operations, image 510 shows the segmentation of the brain tumor based on multi-scale tumor probability map and salient region detection, image 512 shows the robust label initialization, and image 508 shows the segmentation result by the proposed method. It is shown that the proposed method could extract statistical reliable and spatially compact initial label by comparing image 506 and 512, and the proposed method could successfully segment the brain tumor by comparing image 508 with image 108 in FIG. 1.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for brain tumor segmentation in multi-parametric 3D magnetic resonance (MR) images, comprising:
   determining, for each voxel in the multi-parametric 3D MR image sequence, a probability that the voxel is part of brain tumor;
   extracting multi-scale structure information of the image;
   generating multi-scale tumor probability map based on initial tumor probability at voxel level and multi-scale structure information;
   determining salient tumor region based on multi-scale tumor probability map;
   obtaining robust initial tumor and non-tumor label based on tumor probability map at voxel level and salient tumor region; and
   generating a segmented brain tumor image using graph based label information propagation.

2. The method of claim 1, further comprising pre-processing the multi-parametric 3D MR images:
   performing co-registration to compensate for possible motions between multi-parametric 3D MR scans;
   performing skull-stripping to remove non-brain tissue in multi-parametric 3D MR images;
   performing bias field correction to remove intensity inhomogeneity partially in multi-parametric 3D MR images; and
   performing inter-subject image intensity standardization.

3. The method of claim 1, wherein said step of determining, for each voxel in the multi-parametric 3D MR image sequence, a probability that the voxel is part of brain tumor comprises:
   determining the probability for each voxel using a trained support vector machine (SVM) classifier.

4. The method of claim 3, wherein for each voxel in the multi-parametric 3D MR image sequence:
   formulating the feature vector for each voxel based on the image information within its spatial neighborhood.

5. The method of claim 1, wherein said step of extracting the multi-scale structure information of the image comprises:
   extracting the multi-scale structure information using aggregation based method with respect to the inter-voxel image information similarity.

6. The method of claim 5, wherein voxels with similar image information are aggregated into regions and the region's statistical image feature and tumor probability is calculated, repeating the procedure until the whole image are aggregated into only one region, and achieving the image's multi-scale structure and multi-scale tumor probability map.

7. The method of claim 1, wherein said determining salient tumor region comprises:
   calculating the mean and standard deviation of all the voxels' tumor probability within the probability map at the boundary scale; and
   voxels with tumor probability far away more than one standard deviation from the mean value are regarded as the salient tumor region.

8. The method of claim 1, wherein said graph based label information propagation comprises:
   constructing the graph according to the image information;
   initializing the label of the graph node; and
   optimizing the objective function of the segmentation iteratively.

9. The method of claim 8, wherein said constructing the graph according to the image information comprises:
   constructing undirected weighted graph, where each node corresponds to one voxel in the image and the weight of each edge reflects the image similarity of the two nodes linked.

10. The method of claim 8, wherein said initializing the label of the graph node comprises:
    initializing the label value for each node based on the tumor probability map at voxel level and the salient tumor region detected.

11. The method of claim 8, wherein said optimizing the objective function of the segmentation comprises:

the objective function of segmentation comprises a fitting term related to label initialization and a smoothing term based on pair-wise homogeneity in segmentation labels weighted by the graph edge weight.

\* \* \* \* \*